United States Patent [19]

Hoffman

[11] Patent Number: 5,306,999
[45] Date of Patent: Apr. 26, 1994

[54] ELECTRIC VEHICLE CHARGING STATION

[75] Inventor: Ernest G. Hoffman, Middlefield, Conn.

[73] Assignee: Hubbell Incorporated, Orange, Conn.

[21] Appl. No.: 5,101

[22] Filed: Jan. 15, 1993

[51] Int. Cl.$^5$ ............................................. H02J 7/00
[52] U.S. Cl. ........................................... 320/2; 320/21
[58] Field of Search ....................... 320/2, 21, 3, 4, 5

[56] References Cited

U.S. PATENT DOCUMENTS

| | | | |
|---|---|---|---|
| 4,158,802 | 6/1979 | Rose, II | 302/2 |
| 4,347,472 | 8/1982 | Lemelson | 320/2 |
| 4,431,241 | 2/1984 | Hazelhurst | 339/43 |
| 4,489,223 | 12/1984 | Puckett et al. | 320/2 X |
| 4,800,328 | 1/1989 | Bolger et al. | 320/2 |
| 4,843,477 | 6/1989 | Mizutani et al. | 358/248 |
| 4,902,955 | 2/1990 | Manis et al. | 320/2 |
| 5,083,076 | 1/1992 | Scott | 320/2 |
| 5,157,319 | 10/1992 | Klontz et al. | 320/2 |
| 5,214,368 | 5/1993 | Wells | 320/2 |
| 5,252,078 | 10/1993 | Langenbahn | 320/2 X |
| 5,256,954 | 10/1993 | Chen | 320/2 |

FOREIGN PATENT DOCUMENTS

| | | | |
|---|---|---|---|
| 2330255 | 1/1975 | Fed. Rep. of Germany | 320/2 |
| 0069404 | 4/1983 | Japan | 320/2 |
| 0287607 | 11/1988 | Japan | 320/2 |

OTHER PUBLICATIONS

"Infrastructure-EV Charging Meter," Green Car Journal, Nov. 1992, p. 124.

Primary Examiner—Kristine L. Peckman
Attorney, Agent, or Firm—Jerry M. Presson; David L. Tarnoff

[57] ABSTRACT

An electric vehicle charging station for recharging an electric vehicle. The electric vehicle charging station has a base unit with a control box electrically coupled to an electrical power line, and a retractable support arm assembly with an electrical conductor and an electrical connector coupled thereto for movement between a retracted position and an extended position. The support arm assembly includes various support arms and/or linkages which provide limited degrees of vertical movement and horizontal movement.

20 Claims, 6 Drawing Sheets

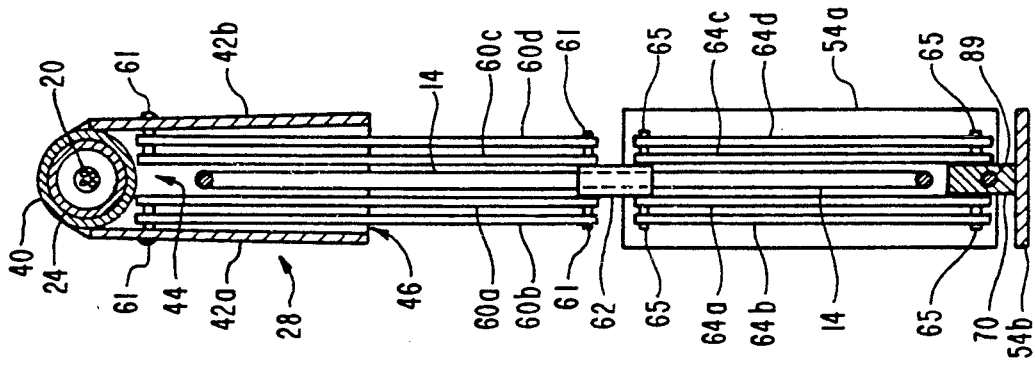
FIG. IA
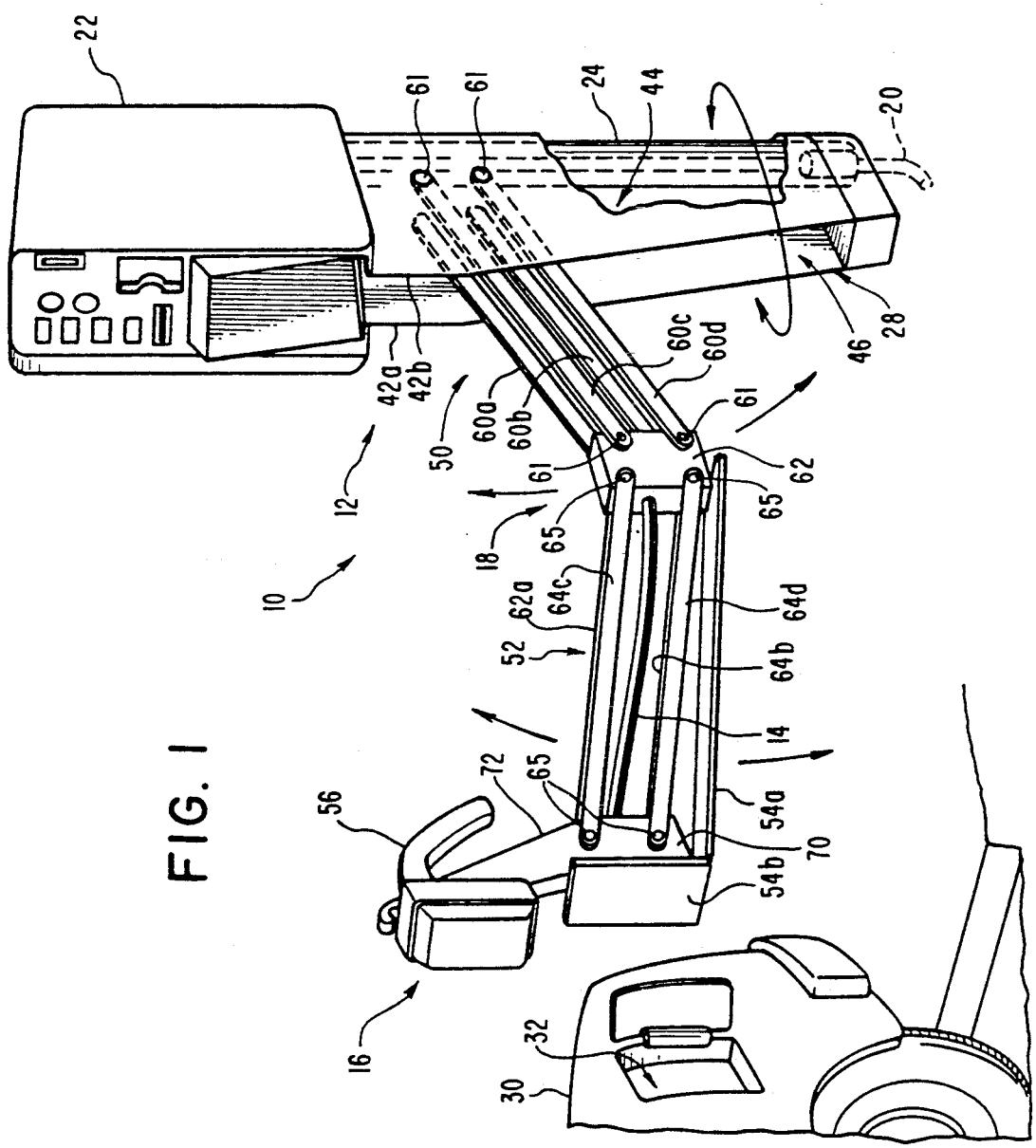
FIG. I

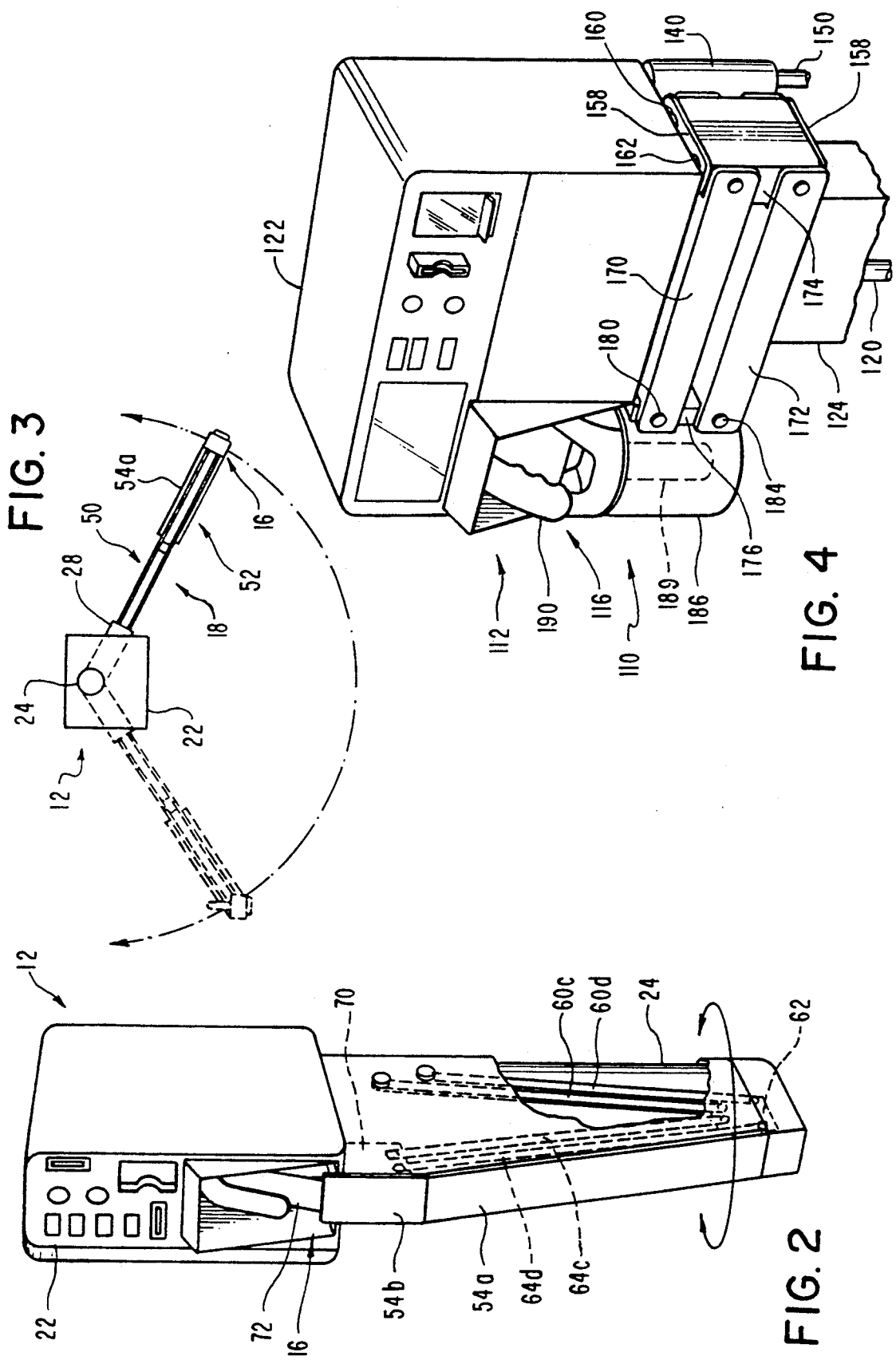

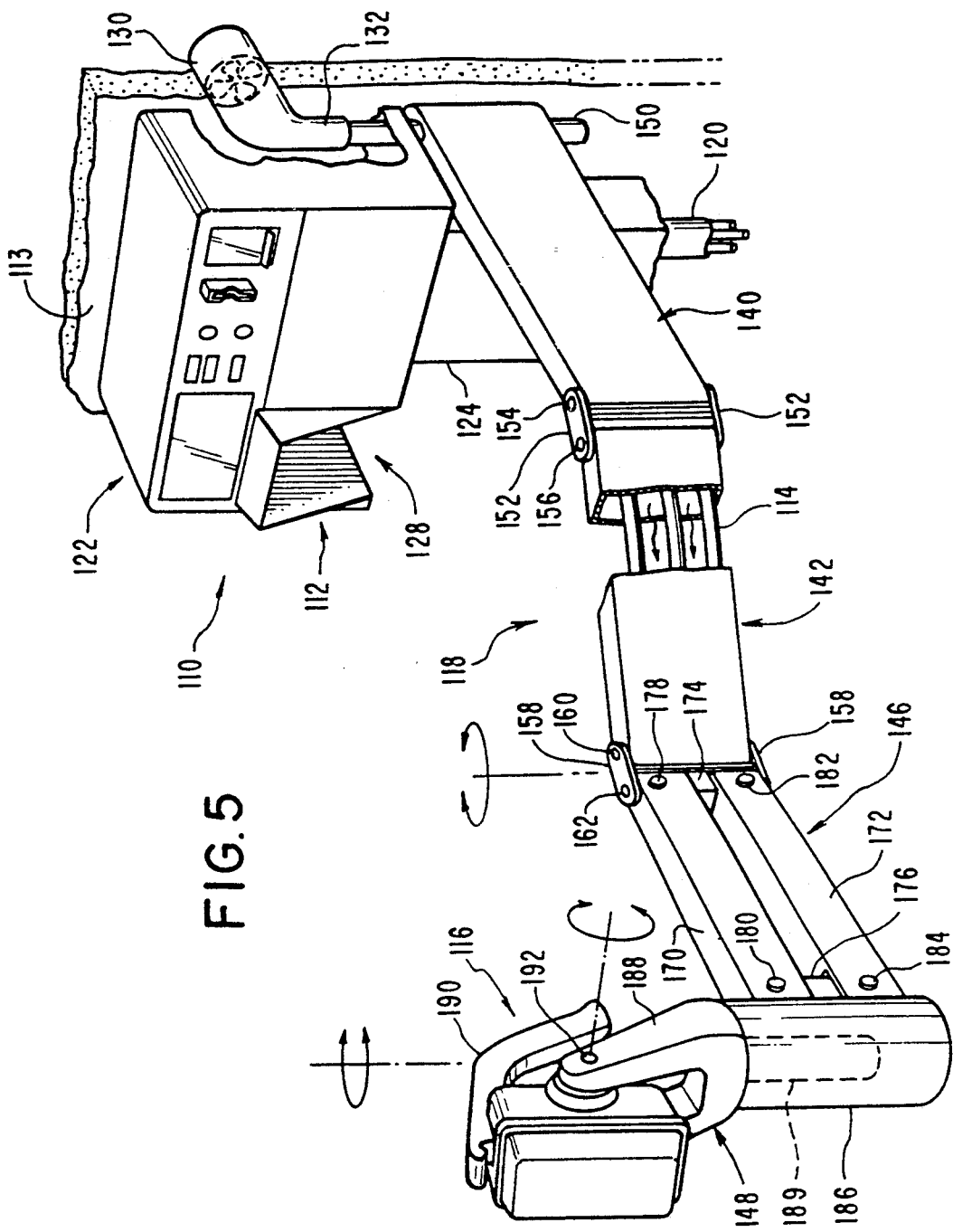

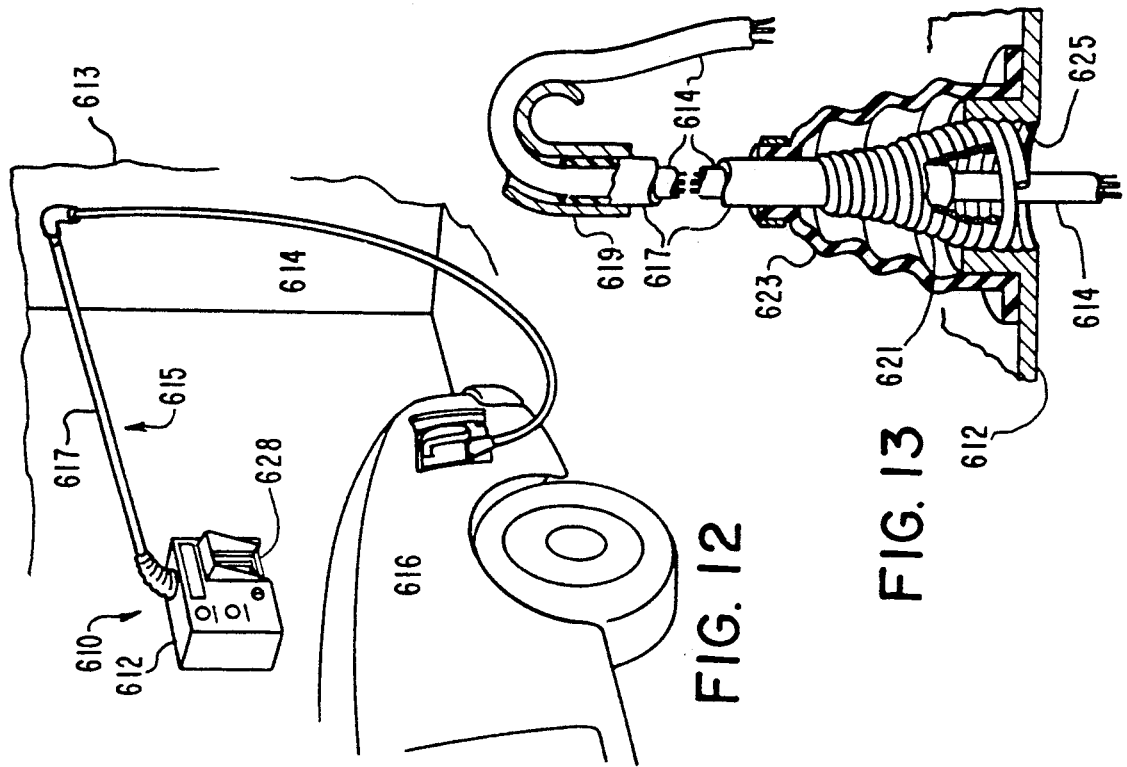
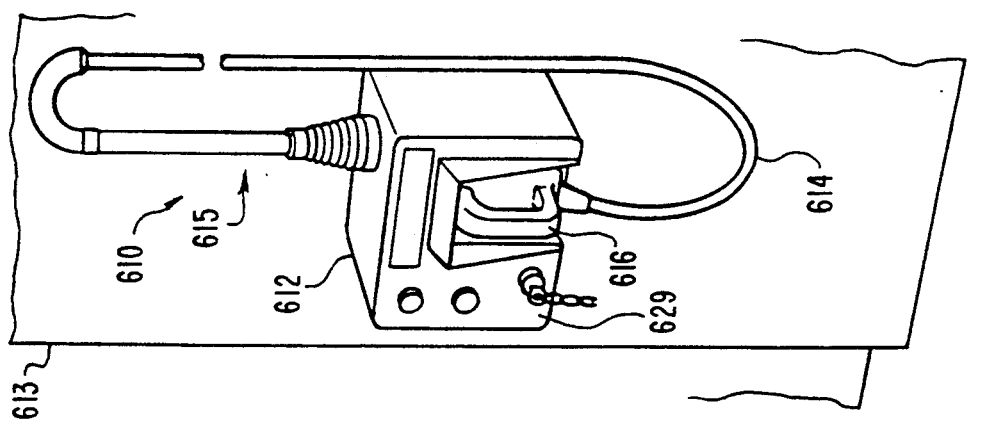
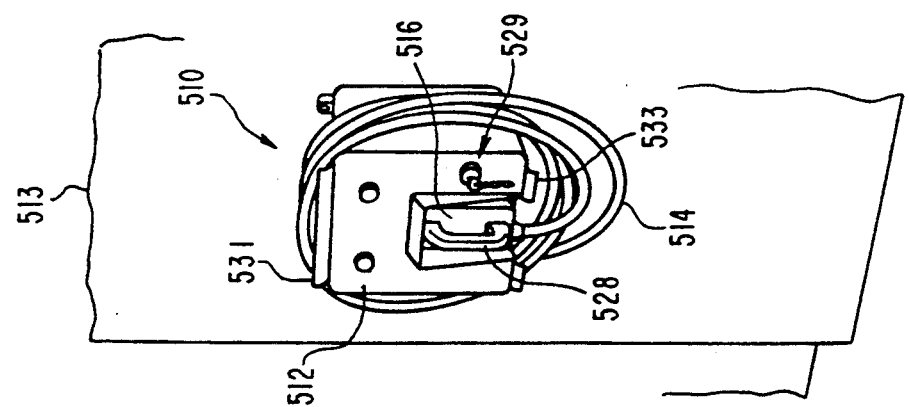

ELECTRIC VEHICLE CHARGING STATION

FIELD OF THE INVENTION

This invention relates to an electric vehicle charging station for recharging electric vehicles. Specifically, the invention relates to an electric vehicle recharging station having at least one electrical conductor with an electrical connector mounted on a retractable support arm assembly which articulates in both vertical and horizontal directions.

BACKGROUND OF THE INVENTION

The number of automobiles being operated is continuing to increase which has significantly increases the worldwide air pollution problem. This air pollution problem from automobiles has prompted many countries to regulate the exhaust emissions from automobiles. In fact, the exhaust emissions standards are constantly becoming stricter each year. For example, California regulators have recently passed a law requiring 2% of all vehicles sold in California to be "zero-emissions" or electric powered by 1998. Failure to meet the new emission standard would result in significant fines to automobile manufacturers selling automobiles in California. Accordingly, automobile manufacturers, ability to sell automobiles in California will be hurt if they do not produce an automobile with zero-emissions.

In view of these increasingly stricter emission requirements, automobile manufacturers are beginning to develop electric powered vehicles. Accordingly, it will be necessary to provide the owners of the electric vehicles with a safe and easy way of recharging their batteries. Moreover, electric vehicles have a limited range of travel before requiring their batteries to be recharged. Thus, recharging stations will be needed which are conveniently located and easy to operate in substantially the same manner in which gas stations are currently available for gas powered vehicles.

One example of an electric vehicle and a recharging station for recharging the batteries of electric vehicles is disclosed in U.S. Pat. No. 4,158,802 to Rose, II. The electric vehicle and the recharging station disclosed in the patent issued to Rose, II have many drawbacks. For instance, the vehicle is exposed to the environment which can cause the contacts of the electrical inlet mounted on the vehicle to corrode. Also, the electrical contact surfaces of the vehicle and the recharging station are exposed to the driver such that the driver of the vehicle could accidentally touch one of the electric contacts and receive an electrical shock. Furthermore, this recharging station would require all electric vehicles to be manufactured within a certain range of sizes and shapes to allow its spring biased contacts to properly engage the contacts on the vehicle.

In view of the above, it is apparent that there exists a need for electrical recharging stations which will overcome the above problems of the prior art, and which are safe and convenient to operate. This invention addresses this need in the art along with other needs which will become apparent to those skilled in the art once given this disclosure.

SUMMARY OF THE INVENTION

Accordingly, a primary object of the present invention is to provide an electric vehicle charging station which is safe and convenient to operate.

Another object of the present invention is to provide an electric vehicle charging station which can be located in practically any location, including both residential and commercial applications.

Another object of the present invention is to provide an electric vehicle charging station which is relatively inexpensive to construct.

Another object of the present invention is to provide an electric vehicle charging station which can be easily adapted for use with vehicles of any size or shape.

Another object of the present invention is to provide support to the electrical connector to protect it from damage.

The foregoing objects are basically attained by providing an electric vehicle charging station for recharging an electric vehicle, comprising a base structure coupled to an electrical power source; at least one electrical conductor having a first end and a second end with the first end being electrically coupled to the power source; an electrical contact coupled to the second end of the electrical conductor for electrically coupling and dispensing electrical energy to the electric vehicle; a substantially rigid support assembly movably coupled to the base structure for movably supporting the electrical contact and the electrical conductor between a retracted position and an extended position; and a control mechanism electrically coupled to the electrical power source for regulating the flow of electrical energy from the power source to the electric vehicle.

Other objects, advantages and salient features of the invention will become apparent from the following detailed description, which, taken in conjunction with the annexed drawings, discloses several preferred embodiments of the invention.

BRIEF DESCRIPTION OF THE DRAWINGS

Referring now to the drawings which form part of this original disclosure:

FIG. 1 is a partial perspective view of an electric vehicle charging station in accordance with a first embodiment of the present invention, especially designed for use in parking garages and along curbs of streets;

FIG. 1A is a horizontal cross-sectional view of the electric vehicle charging station illustrated in FIG. 1;

FIG. 2 is an perspective view of the electric vehicle charging station of FIG. 1 with the support arm in its retracted position;

FIG. 3 is a schematic top plan view of the electric vehicle charging station of FIGS. 1 and 2 illustrating the pivotal movement of the support arm;

FIG. 4 is a partial perspective view of an electric vehicle charging station in accordance with a second embodiment of the present invention, and having its support arm in its retracted position;

FIG. 5 is a perspective view of the electric vehicle charging station illustrated in FIG. 4 with the support arm in its extended position;

FIG. 5A is a partial perspective view of a modified support arm of FIG. 5 having a counterweight coupled thereto;

FIG. 10 is a partial perspective view of a sixth embodiment of an electric vehicle charging station in accordance with the present invention;

FIG. 11 is a partial perspective view of a seventh embodiment of an electric vehicle charging station in accordance with the present invention;

FIG. 12 is a partial perspective view of the electric vehicle charging station of FIG. 11 with its electrical connector plugged into an electric vehicle; and FIG. 13 is an enlarged, partial perspective view of the post assembly of the electric vehicle charging of FIGS. 11 and 12.

DETAILED DESCRIPTION OF THE INVENTION

Figure 7:
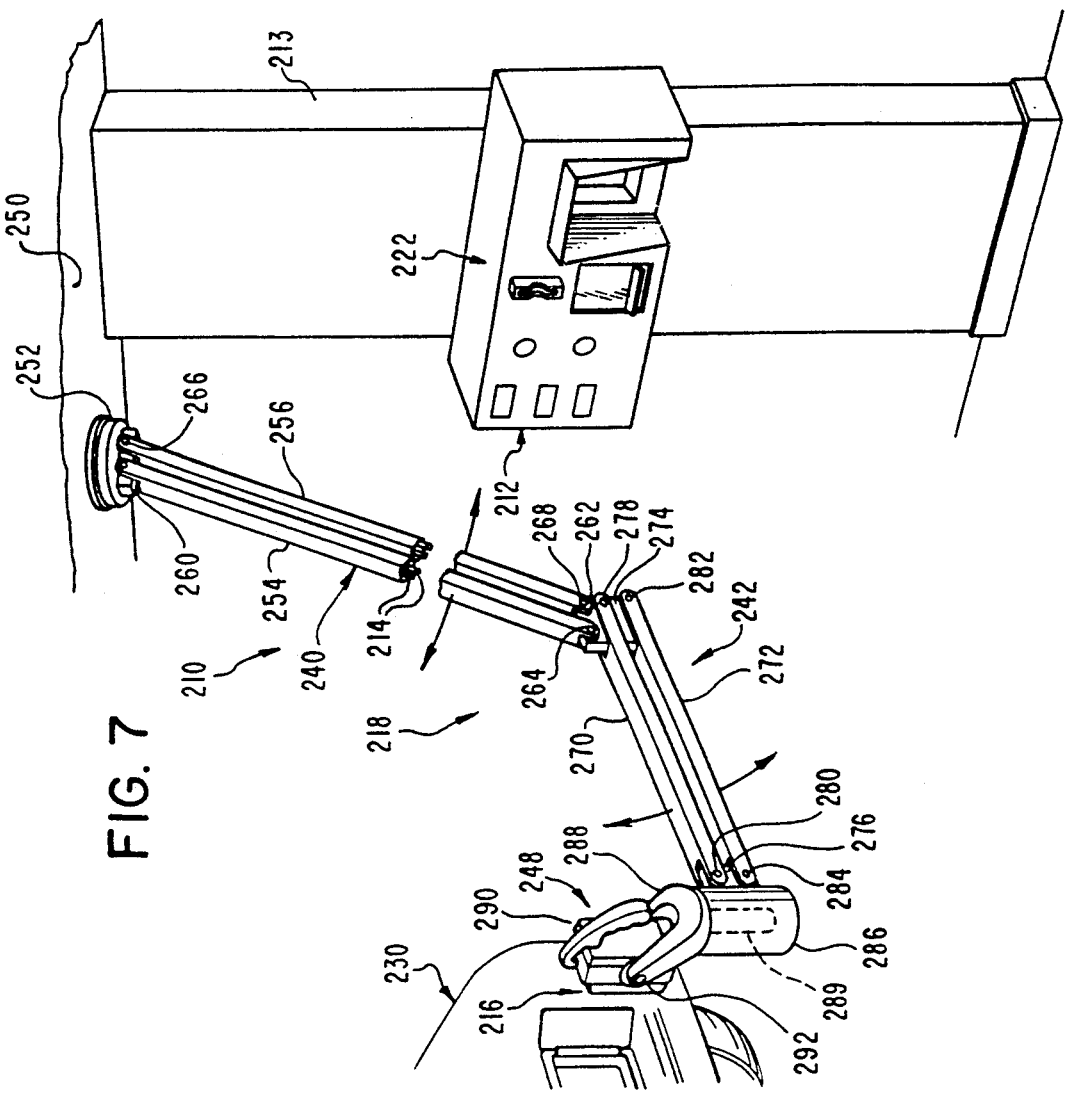
FIG. 7 is a partial perspective view of the electric vehicle charging station illustrated in FIG. 6 with the support arm in its extended position and just prior to connection with an electric vehicle.

Referring initially to FIGS. 1-3, a first embodiment of an electric vehicle charging station 10 in accordance with the present invention is illustrated, and includes a base unit structure 12 mounted at the side of a street curb, an electrical cable 14 electrically coupled at one end to base unit 12, an electrical connector 16 electrically connected to the other end of cable 14, and a retractable support arm assembly 18 movably coupled at one end to base unit 12 for supporting cable 14 and movably coupled electrical connector 16 for movement therewith.

Base unit 12 includes a control box 22 with conventional electronic circuitry, a support post 24 for supporting control box 22 above the ground, and an enclosure 28 pivotally coupled to support post 24.

Base unit 12 is electrically coupled to an electrical power line or source 20, which in turn is preferably connected to the local electrical utility company's power line or any other conventional source of electrical energy. Base unit 12 can be mounted in practically any location, including residential houses, apartment buildings, gas stations, parking garages, or even at the side of a street curb as illustrated in FIG. 1 so that power can be readily available to a vehicle 30.

In commercial applications such as illustrated in FIGS. 1-3, base unit 12 can be constructed to use similar electronic circuitry as is currently being used in today's automated gas stations. For example, control box 22 can be provided with a conventional power meter for determining the amount of electrical energy dispensed, a credit card or debit card slot for payment of the dispensed electrical energy, and/or any other similar type of controls which are provided at automated gas stations.

Support post 24 is preferably rigidly coupled at its upper end to control box 22 and rigidly connected to the ground. Post 24 is preferably cemented into the sidewalk or parking garage. Preferably, power line 20 enters through the interior of support post 24, and is then electrically connected to control box 22 in a conventional manner.

Enclosure 28 is preferably pivotally coupled to post 24 to pivot at least approximately 180° as seen in FIG. 3, and includes a tubular member 40 pivotally coupled to post 24, and a pair of parallel side panels 42a and 42b fixedly coupled to tubular member 40 along its rear edges to form a cavity 44 between side panels 42a and 42b with an open front end 46 for receiving support arm assembly 18 therein as seen in FIG. 2.

Electrical power cable 14 is preferably a conventional electrical cable preferably having three insulated power conductors and two insulated communication conductors which are electrically connected at one end to power line 20 and the circuitry of control box 22 and electrically coupled at their other ends to electrical connector 16. Since electrical cable 14 and its electrical connections to power line 20, control box 22 and electrical connector 16 are conventional and well known in the electrical art, they will not be discussed or illustrated in detail herein.

Electrical connector 16 is only schematically represented in FIGS. 1-3 since any electrical connector with electrical contacts can be utilized in the present invention which will mate with a complementary electrical connector mounted in vehicle 30. Preferably, electrical connector 16 is a plug with female contacts which is received in a mating electrical connector or receptacle 32 with male contacts in vehicle 30.

Support arm assembly 18 includes a first counterbalanced parallelogram linkage 50, a second counterbalanced parallelogram linkage 52, a pair of cover panels 54a and 54b coupled to second parallelogram 52, and a connector mounting 56 movably coupled to second parallelogram 52 for supporting electrical connector 16.

First parallelogram linkage 50 includes four rigid side links 60a-60d which form a pair of parallelograms. In particular, one end of each link 60a-60d is pivotally coupled to enclosure 28 by horizontal pins 61, while the other ends of each of the links 60a-60d is pivotally coupled to an intermediate support block 62 by horizontal pins 61. Specifically, links 60a and 60b together with a portion of panel 42a and a portion of support block 62 form a first parallelogram. Likewise, links 60c and 60d together with a portion of panel 42b and a portion of support block 62 form a second parallelogram which is parallel to the first parallelogram which is formed by links 60a and 60b. Accordingly, links 60a-60d will always remain parallel, while support block 62 will always remain in the same vertical position or orientation. Preferably, links 60a-60d are constructed of a hard, rigid material such as a corrosion resistant metallic material. As seen in FIG. 1A, links 60a and 60b are preferably not vertically aligned with links 60b and 60d to permit links 60a-60d to fold within enclosure 28.

Second parallelogram linkage 52 includes four rigid links 64a-64d which form a pair of parallelograms. In particular, links 64a and 64b are pivotally connected at one of their ends to a portion of support block 62 by horizontal pins 65, and pivotally connected at their other ends to a portion of handle 56 by horizontal pins 65. Likewise, links 64c and 64d are pivotally connected at one end to a portion of support block 62 by horizontal pins 65 and pivotally connected at their other ends to a portion of connector mounting 56. Accordingly, links 64a-64d will always remain parallel and connector mounting 56 will also remain in the same vertical orientation. Preferably, links 64a-64d are constructed of a hard, rigid material such as a corrosion resistant metallic material.

Parallelogram linkages 50 and 52 are counterbalanced so that when support arm assembly 18 is pivoted vertically via links 60a-60d and links 64a-64d, support arm assembly 18 along with electrical connector 16 will remain in that position.

Panel 54a is preferably a flat rectangular panel which is slightly larger than the space of cavity 44 between side panels 42a and 42b. Panel 54a is rigidly coupled to the bottom surfaces of links 64b and 64c and covers a lower portion of the open end 46 of cavity 44 when support arm assembly 18 is in its retracted position.

Panel 54b is preferably a substantially rectangular, flat plate which is slightly larger than the width of cavity 44 between side panels 42c and 42b for covering an upper portion of open end 46 of cavity 44 when support arm assembly 18 is in its retracted position. Panel 54b is rigidly coupled to lower portion 70 of handle 56. Accordingly, panels 54a and 54b completely cover open end 46 of cavity 44 when support arm assembly 18 is in its retracted position.

Connector mounting 56 preferably includes a lower portion 70 which is pivotally connected to links 64a-64d, and an upper handle portion 72 with electrical connector 16 rigidly coupled thereto and pivotally connected to lower portion 70 via a pivot shaft 89 in a conventional manner for rotatably supporting electrical connector 16 relative to links 60a-60d and 64a-64d.

In operation, a user would grasp upper handle portion 72 and pull electrical connector 16 from control box 22, and then insert electrical connector 16 into the mating electrical connector 32 of vehicle 30. This will cause support arm assembly 18 to move from its retracted position contained within enclosure 28 to an extended position in which tubular member 40 and parallelogram linkages 50 and 52 allow the user to obtain correct alignment between male electrical connector 16 and the female electrical connector 32 of vehicle 30. Specifically, parallelogram linkages 50 and 42 allow for vertical movement of electrical connector 16 while upper portion 72 of handle 56 and tubular member 40 allows for horizontal movement and orientation of electrical connector 16.

Now the user can transfer electrical energy from power source 20 by using control box 22 to dispense electrical energy through cable 14 and electrical connector 16 to vehicle 30. When the user is finished recharging vehicle 30, the user will reinsert electrical connector 16 into the port of control box 22, which will in turn cause support arm assembly 18 with cable 14 thereon to retract into enclosure 28.

Electric Vehicle Charging Station 110

Referring now to FIGS. 4 and 5, an electric vehicle charging station 110 in accordance with a second embodiment of the present invention is illustrated. Electric vehicle charging station 110 includes a base unit 112 rigidly mounted to the ground in a conventional manner, a plurality of electrical cables 114 electrically coupled at one of their ends to base unit 112, an electrical connector 116 electrically connected to the other ends of cables 114, and a retractable support arm assembly 118 movably coupled at one end to base unit 112 for supporting cables 114 and electrical connector 116 thereon.

Base unit 112 includes a control box 122 with conventional electronic circuitry therein, a support post 124 for supporting control box 122 above the ground, and a port 128 in control box 122 for receiving a portion of electrical connector 116 therein.

Base unit 112 is electrically connected to an electrical power line or source 120, which in turn is preferably connected to the local electrical utility company's power line or any other conventional source of electrical energy. The base unit 112 is preferably mounted in commercial applications such as at gas stations, parking garages, or at the side of a street curb.

Electrical power cables 114 are preferably conventional electrical cables with a conductive core and an insulated sheath which are electrically connected at one of their ends to the circuitry of control box 122 and power line 120, and electrically coupled at their other ends to electrical connector 116. Since electrical cables 114 and its electrical connections are well known in the electrical art, they will not be discussed or illustrated in detail herein.

Electrical connector 116 is only schematically represented in FIGS. 4 and 5 since any electrical connector with electrical contacts can be utilized in the present invention, which will mate with a complementary electrical connector mounted in an electric vehicle. Preferably, electrical connector 116 is a male electrical connector or a plug which is received in a mating female electrical connector in an electric vehicle.

Support arm assembly 118 includes a first arm 140 pivotally coupled at one end to control box 122, a second support arm 142 pivotally coupled to the other end of first pivot arm 140, a counterbalanced parallelogram support linkage 146 pivotally coupled to second support arm 142, and a connector mounting 148 rotatably coupled to parallelogram support linkage 146.

First support arm 140 is preferably a hollow tubular member having a rectangular transverse cross section for receiving cables 114 therethrough, as well as for receiving cooling air from fan 130 therethrough via tube 132. Support arm 140 also shields cables 114 from RFI, EMI and extra low frequency magnetic fields (ELF). One end of support arm 140 is pivotally coupled to control box 122 via vertically extending pivot pin 150. Accordingly, support arm 140 can move horizontally about the vertical axis of pivot pin 150 between a retracted position as seen in FIG. 4 and an extended position as seen in FIG. 5.

Referring to FIG. 5A the end of first support arm 140 may also be pivotally coupled to base unit 112 via a horizontal pivot pin 151 in addition to vertical pivot pin 150, and have either a counterweight 153 or a tension spring 155 (not shown) coupled to the end opposite second support arm 142 for counterbalancing support arm assembly 118. In other words, if a downwardly directed force is applied to support arm assembly 118, then pivot pin 151 will permit support arm assembly 118 to pivot vertically downwardly while counterweight 153 will restore support arm assembly 118 to its normal position upon release of such a downwardly directed force.

Referring again to FIG. 5, support arm 142 is preferably a hollow tubular member having a rectangular transverse cross section for receiving cables 114 therethrough, as well as for receiving cooling air from fan 130 therethrough via tube 132. Support arm 142 also shields cables 114 from RFI, EMI and ELF. Support arm 142 is pivotally connected to support arm 140 by a pair of pivot links 152 which are pivotally connected at opposite ends by a pair of vertical pivot pins 154 and 156 to support arms 140 and 142, respectively. The other end of support arm 142 is pivotally connected to parallelogram linkage 146 by a pair of support links 158.

Links 158 each includes a first pivot pin 160 pivotally coupling one end of link 158 to support arm 142 and a second pivot pin 162 pivotally coupling a second end of link 158 to parallelogram linkage 146. Accordingly, second support arm 142 is pivotally coupled for horizontal movement about the vertical axes of pins 154 and 156 between a retracted position as seen in FIG. 4 and an extended position as seen in FIG. 5.

Parallelogram support linkage 146 includes a first side link 170, a second side link 172, a first end link 174 and a second end link 176. Side links 170 and 172 are preferably hollow tubular members having a rectangular transverse cross section for receiving cables 114 therethrough, as well as for receiving cooling air from fan 130 therethrough. First side link 170 is pivotally coupled to first end link 174 by a horizontal pivot pin 178 and pivotally coupled to second end link 176 by a second horizontal pivot pin 180.

Side link 172 is pivotally coupled at one end to end link 174 by a first horizontal pivot pin 182 and pivotally coupled at its other end to end link 176 by a second horizontal pivot pin 184.

Accordingly, links 170, 172, 174 and 176 allow parallelogram linkage 146 to pivot vertically relative to support arms 140 and 142. In fact, parallelogram support linkage 146 can also pivot horizontally relative to support arms 140 and 142 via pivot pins 160.

Connector mounting 148 includes a lower base portion 186 rigidly coupled to end link 176, an intermediate portion 188 rotatably coupled to lower portion 186 via a vertical pivot shaft 189, and an upper handle portion 190 pivotally coupled to intermediate portion 188 via a pair of horizontal pivot pins 192.

Connector mounting 148 has a passageway 194 extending through lower base portion 186, intermediate portion 188 and handle portion 190 so that cables 114 as well as cooling air passes from side links 170 and 172 to the electrical contacts contained within electrical connector 116. Electrical connector 116 is provided with a pivotally mounted cover 117 which is pivotally connected to handle portion 190 via hinges (not shown). When cover 117 is pivoted to expose the contacts of electrical connector 116, the cooling air passing through the passageway 194 exits handle portion, and is then fed into the receptacle 32 of vehicle 30.

Handle portion 190 has electrical connector 116 rigidly coupled thereto. Accordingly, electrical connector 116 is movably mounted horizontally about the vertical axis of pivot shaft 189 and vertically about pivot pins 192, as well as horizontally by support arms 140 and 142 and vertically by parallelogram linkage 146.

Electric Vehicle Charging Station 210

Figure 6:
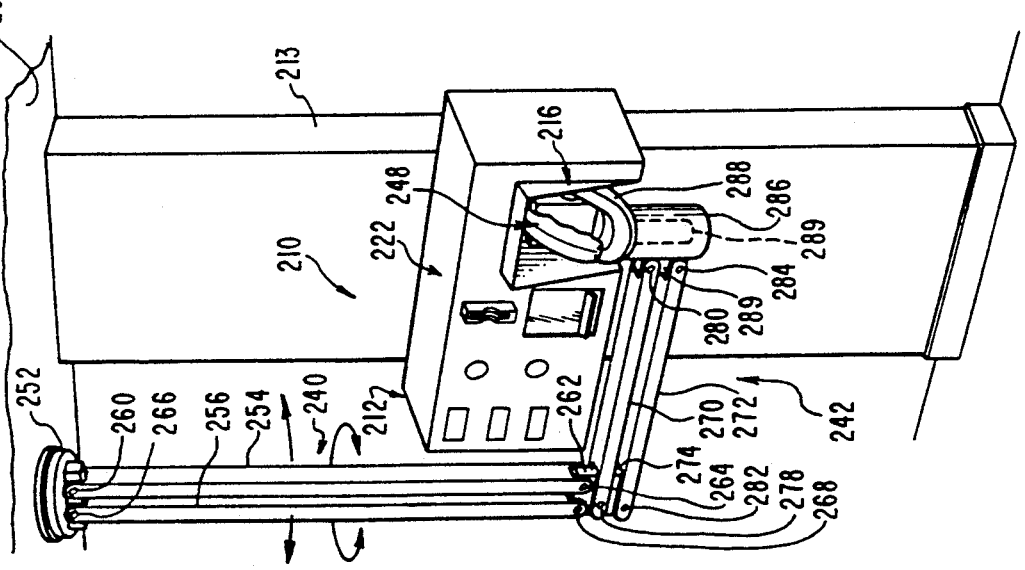
FIG. 6 is a partial perspective view of an electric vehicle charging station in accordance with a third embodiment of the present invention especially designed for commercial application such as gas stations, and having its support arm in the retracted position.

Referring now to FIGS. 6 and 7, an electric vehicle charging station 210 in accordance with a third embodiment of the present invention is illustrated, and includes a base unit 212 fixedly mounted to the ground or a support structure 213 such as a building, a plurality of electrical cables 214 electrically coupled at one of their ends to base unit 212, an electrical connector 216 electrically coupled to the other ends of cables 214, and a retractable support arm assembly 218 movably coupled at one end to base unit 212 for supporting cable 214 and an electrical connector 216 for movement therewith.

Electric vehicle charging station 210 is a modified version of electrical recharging station 110 and is substantially identical in construction and function, except that support arm assembly 218 of electrical vehicle charging station 210 has been modified. Accordingly, base unit 212, electrical cable 214, and electrical connector 216 will not be discussed in detail.

Support arm assembly 218 includes a first counterbalance parallelogram linkage 240, a second counterbalance parallelogram linkage 242, and a connector mounting 248 pivotally coupled to second parallelogram linkage 242.

First parallelogram linkage 240 is rotatably coupled to a support structure or ceiling 250 by a conventional rotatably plate 252, and pivotally coupled at its other end to second parallelogram support linkage 242. First parallelogram support linkage 240 includes a first side link 254 pivotally coupled between a downwardly extending flange or universal joint of plate 252 and second parallelogram support linkage 242, and a second side link 256 pivotally coupled between a downwardly extending flange or universal joint of plate 252 and second parallelogram support linkage 242.

Links 254 and 256 are preferably hollow tubular members for receiving electrical cables 214 therethrough. Tubular links 254 and 256 are positioned to receive cooling air from a fan (not shown) located in the ceiling 250 for cooling cables 214. Also, tubular links 254 and 256 shields cables 214 from RFI, EMI and ELF. First side link 254 is pivotally coupled to plate 252 via a horizontal pivot pin 260 extending through a bore in a downwardly extending flange of plate 252, while the other end of pivot link 254 is pivotally coupled to an end link 262 via a horizontal pivot pin 264. Likewise, second side link 256 is pivotally coupled at one end to plate 252 via a horizontal pivot pin 266 extending through a bore in a downwardly extending flange of plate 252, while the other end of second link 256 is pivotally coupled to end link 262 via a horizontal pivot pin 268.

Preferably, plate 252 includes a pair of conventional universal joints (not shown) connecting side link 254 and 256 via pins 260 and 266 thereto. This pivotal arrangement allows for a limited amount of pivot movement therebetween.

Parallelogram support linkage 242 includes a first side link 270, a second side link 272 maintained parallel to first side link 270, a first end link 274 pivotally coupled to first and second side links 270 and 272, and a second end link 276 pivotally coupled to the other ends of side links 270 and 272. First side link 270 is pivotally coupled to first end link 274 via a horizontal pivot pin 278 at one end and pivotally coupled at its other end to second end link 276 via a horizontal pivot pin 280.

Second side link 272 is pivotally coupled at one end to first end link 274 via a horizontal pivot pin 282 and pivotally coupled at its other end to end link 276 via a horizontal pivot pin 284.

First side link 270 is fixedly coupled to end link 262 for movably coupling second parallelogram linkage 242 to first parallelogram support linkage 240. Second end link 276 is fixedly coupled to connector mounting 248 for movably coupling connector mounting 248 to second parallelogram linkage 242.

Connector mounting 248 includes a lower base portion 286 rigidly coupled to end link 276, an intermediate portion 288 rotatably coupled to lower portion 286 via a vertical pivot shaft 289, and an upper handle portion 290 pivotally coupled to intermediate portion 288 via a pair of horizontally mounted pivot pins 292.

Upper portion 290 has electrical connector 216 rigidly coupled thereto. Accordingly, electrical connector 216 is movably mounted horizontally about the vertical axis of pivot shaft 289 and vertically about pins 292, as well as horizontally by plate 252 and vertically by parallelogram support linkages 240 and 242.

Electric Vehicle Charging Station 310

Figure 8:
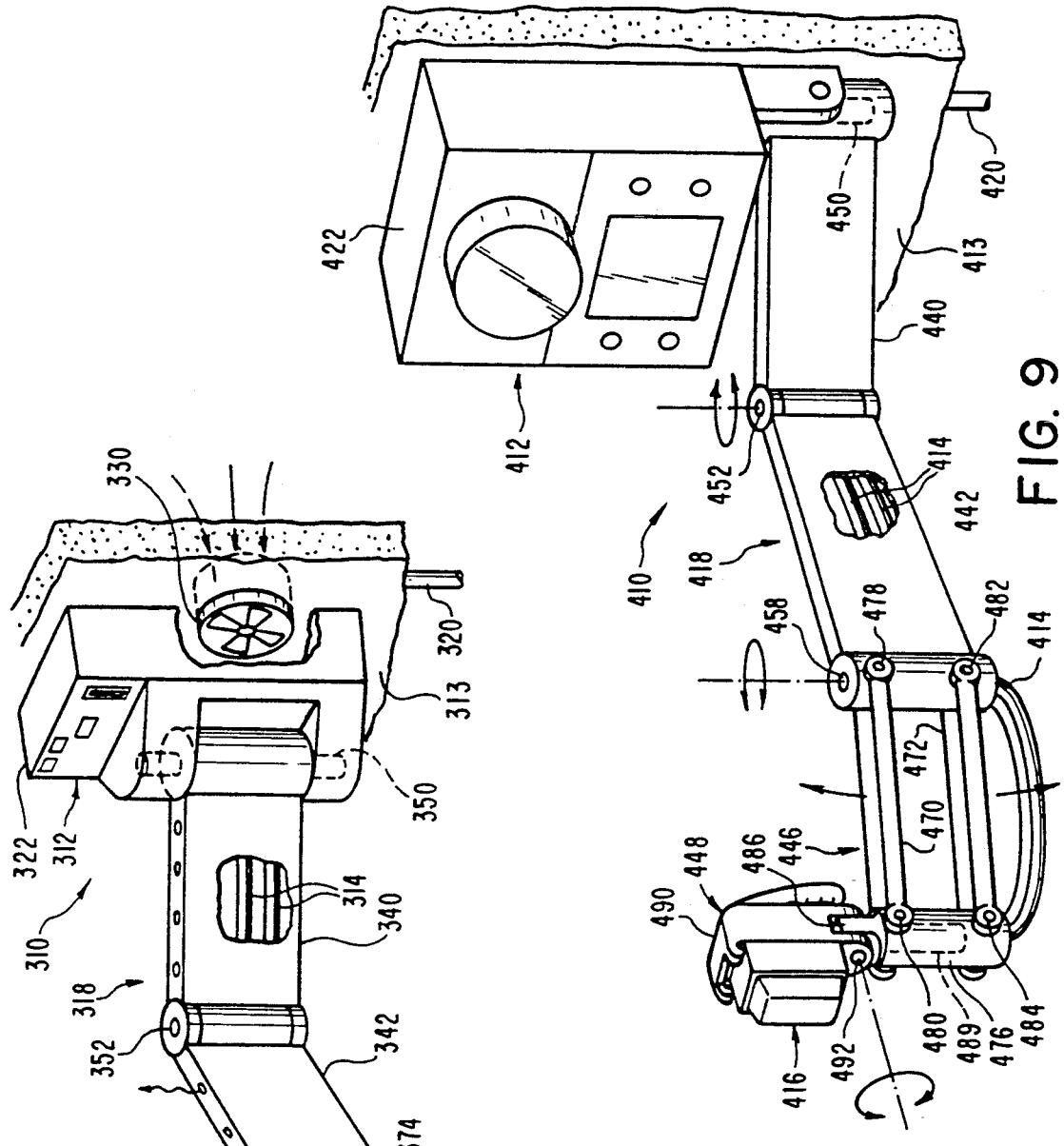
FIG. 8 is a partial perspective view of a fourth embodiment of the present invention especially designed for use in residential applications.

Referring now to FIG. 8, an electrical vehicle charging station 310 in accordance with a fourth embodiment of the present invention is illustrated. Electric vehicle charging station 310 includes a base unit 312 coupled to a building or other support structure 313, a plurality of electrical cables 314 electrically coupled at one end to base unit 312, an electrical connector 316 electrically coupled to the other ends of electrical cables 314, and a retractable support arm assembly 318 movably coupled at one end to base unit 312 for supporting cables 314 thereon as well as electrical connector 316.

Electric vehicle charging station 310 is a further modified version of the electric vehicle charge stations 10, 110 and 210, and is substantially identical thereto in construction, except it has been modified for residential applications and has a modified support arm assembly 318. Thus, the similarities of vehicle charging station 310 with stations 10, 110 and 210 will not be discussed or illustrated in detail herein.

Base unit 312 includes a control box 322 with conventional electronic circuitry therein which is electrically coupled to an electrical power line or source 320, which in turn is preferably connected to the local electrical utility company's power line or any other convention source of electrical energy. The base unit 312 is preferably mounted in a residential setting and coupled to either the residential circuit breaker or residential power meter.

In residential applications, power source 320 can be typically connected in a conventional manner to a circuit breaker panel or power meter in residential homes or apartments. Since the electrical connections, breaker panel, and/or power meter are conventional and well known in the art, they will not be discussed or illustrated in detail herein.

Support arm assembly 318 includes a first arm 340 pivotally coupled to control box 322, a second support arm 342 pivotally coupled at one end to first pivot arm 340, a counterbalanced parallelogram linkage 346 pivotally coupled to second support arm 342, and a handle 348 movably coupled to parallelogram support linkage 346. Optionally, support arm assembly 318 can include a support wheel 334 coupled to second support 342. Wheel 334 support the weight of support arm assembly 318 to prevent bending or breakage thereof.

First support arm 340 is preferably a hollow tubular member having a rectangular transverse cross section for receiving cables 314 therethrough. One end of support arm 340 is pivotally coupled to control box 322 via vertically extending pivot pin 350. Accordingly, support arm 340 can move horizontally about pivot pin 350 between a retracted position and an extended position. Also, this pivotal arrangement allows support arm 340 to swing approximately 180°.

Support arm 342 is preferably a hollow tubular member having a rectangular transverse cross section for receiving cables 314 from support arm 340 therethrough, as well as for receiving cooling air from fan 330 therethrough. Support arm 342 also shields cables 314 from RFI, EMI and ELF. Support arm 342 is pivotally connected to support arm 340 by a vertically extending pivot shaft 352, while the other end of support arm 342 is pivotally connected to parallelogram support linkage 346 via a vertical pivot pin 358.

Forced cooling via fan 330 is not normally required for most residential charging, since the current levels in cables 314 for residential charging should be low enough so as not to cause an over heating problem. However, fan 330 would allow smaller than normal cables to be used and therefore result in a more compact and lighter support structure.

First and second support arms 340 and 342 can be provided with a self stowing feature for automatically retracting support arm assembly 318 when released by the user. Specifically, a torsion spring or other retracting mechanism can be mounted about pivot pins 350, 352 and 358 so that support arms 340 and 342, as well as linkage 346, are all biased to fold up in a retracted position.

Parallelogram support linkage 346 includes a first side link 370, a second side link 372, a first end link 374, and a second end link 376. First side link 370 is pivotally coupled to first end link 374 via a horizontal pivot pin 378 and pivotally coupled to second end link 376 via a second horizontal pivot pin 380.

Side link 372 is pivotally coupled at one end to end link 374 by a horizontally mounted pivot pin 382 and pivotally coupled at its other end to end link 376 by a horizontally pivot pin 384. Accordingly, links 370, 372, 374 and 376 allow parallelogram linkage 346 to pivot vertically relative to support arms 340 and 342. In fact, parallelogram support linkage 346 can also pivot horizontally relative to support arms 340 and 342 via pivot pin 358.

End links 374 and 376 are preferably tubular members which are pivotally coupled about pivot pins 358 and 384, respectively.

Handle 348 includes a base portion 386 rotatably coupled to end link 376 via a pivot shaft 389, and an upper handle portion 390 pivotally coupled to base portion 386 via a pair of horizontally mounted pivot pins 392.

Upper handle portion 390 has electrical connector 316 rigidly coupled thereto. Accordingly, electrical connector 316 is movably mounted horizontally about the vertical axis of pivot shaft 389 and vertically about pivot pins 392, as well as horizontally by support arms 340 and 342 and vertically by parallelogram support linkage 346.

Electric Vehicle Charging Station 410

Figure 9:
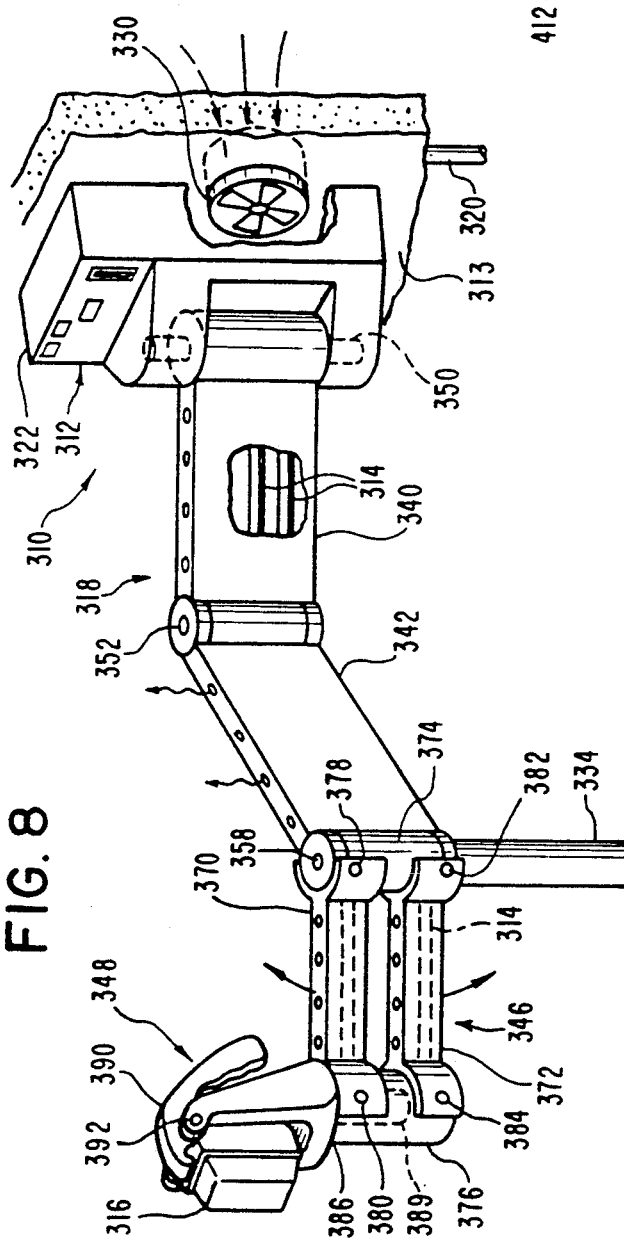
FIG. 9 is a fifth embodiment of an electric vehicle charging station in accordance with a fifth embodiment of the present invention which is also especially designed for residential applications.

Referring now to FIG. 9, an electric vehicle charging station 410 in accordance with a fifth embodiment of the present invention is illustrated. Electric vehicle charging station 410 includes a base unit 412 rigidly coupled to a support structure or building 413, a plurality of electrical cables 414 electrically coupled at one of their ends to base unit 412, an electrical connector 416 electrically coupled to the other ends of cables 414, and a retractable support assembly 418 movably coupled at one end to base unit 412 for supporting cable 414 and electrical connector 416 for movement therewith.

Electric vehicle charging station 410 is a modified version of electric vehicle charging station 310 with substantially identical construction, except for a modified support arm assembly 418 is utilized. Thus, only the differences between vehicle charging station 410 and station 310 will be discussed and illustrated in detail.

Base unit 412 includes a control box 422 with conventional electronic circuitry therein which is electrically coupled to an electrical power line or source 420, which in turn is preferably connected to the local electrical utility company's power line or any other convention source of electrical energy. The base unit 412 is preferably mounted in a residential setting and coupled to either the residential circuit breaker or residential power meter.

Support arm assembly 418 includes a first arm 440 pivotally coupled to control box 422, a second support arm counterbalanced 442 pivotally coupled at one end to first pivot arm 440, a parallelogram linkage 446 pivotally coupled to second support arm 442, and a handle 448 movably coupled to parallelogram support linkage 446.

One end of support arm 440 is pivotally coupled to control box 422 via vertically extending pivot pin 450. Accordingly, support arm 440 can move horizontally about pivot pin 450 between a retracted position and an extended position. Also, this pivotal arrangement allows support arm 440 to swing approximately 180°.

Support arm 442 is pivotally connected to support arm 440 by a vertically extending pivot shaft 152, while the other end of support arm 442 is pivotally connected to parallelogram support linkage 446 via a vertical pivot pin 458.

Parallelogram support linkage 446 includes a first side link 470, a second side link 472, a first end link 474, and a second end link 476. First side link 470 is pivotally coupled to first end link 474 via a horizontal pivot pin 478 and pivotally coupled to second end link 476 via a second horizontal pivot pin 480.

Side link 472 is pivotally coupled at one end to end link 474 by a horizontally mounted pivot pin 482 and pivotally coupled at its other end to end link 476 by a horizontally pivot pin 484. Accordingly, links 470, 472, 474 and 476 allow parallelogram linkage 446 to pivot vertically relative to support arms 440 and 442. In fact, parallelogram support linkage 446 can also pivot horizontally relative to support arms 440 and 442 via pivot pin 458.

End links 474 and 476 are preferably tubular members which are pivotally coupled about pivot pins 458 and 484, respectively.

Handle 448 includes a base portion 486 rotatably coupled to end link 476 via a pivot shaft 489, and an upper handle portion 490 pivotally coupled to base portion 488 via a horizontally mounted pivot pin 492.

Upper handle portion 490 has electrical connector 416 rigidly coupled thereto. Accordingly, electrical connector 416 is movably mounted horizontally about the vertical axis of pivot shaft 489 and vertically about pivot pin 492, as well as horizontally by support arms 440 and 442 and vertically by parallelogram support linkage 446.

Electric Vehicle Charging Station 510

Referring now to FIG. 10, an electric vehicle charging station 510 in accordance with a sixth embodiment of the present invention is illustrated. Electric vehicle charging station 510 includes a base unit 512 coupled to a building or support structure 513, an electrical cable 514 with a plurality of insulated electrical conductors therein, and an electrical connector 516 electrically coupled to the other end of electrical cable 514.

Electric vehicle charging station 510 is a further modified version of electric vehicle charging stations 10, 110, 210, 310 and 410, and is similar in construction thereto, except that it has been modified to eliminate the use of a support arm assembly.

Specifically, electric vehicle charging station 510 is an inexpensive version of the prior embodiments, and includes a hand held conductor 516 which is secured in a cavity 528 of base unit 512. The connector 516 is locked against unauthorized removal by a conventional key locking mechanism 529. Instead of a key operated locking system, an electronic code similar to bank teller machines, i.e., buttons (not shown), could be utilized for locking connector 516 within port 528.

Base unit 512 includes an upwardly extending flange 531 and a downwardly extending flange 533 for retaining cable 514 on base unit 512 when wrapped thereabouts as shown in FIG. 10. Thus, flanges 531 and 533 provide convenient storage of cable 514.

Electric Vehicle Charging Station 610

Referring now to FIG. 10, an electric vehicle charging station 610 in accordance with a sixth embodiment of the present invention is illustrated. Electric vehicle charging station 610 includes a base unit 612 coupled to a building or support structure 613, an electrical cable 614 with a plurality of insulated electrical conductors (not shown) therein, and an electrical connector 616 electrically coupled to the other end of electrical cable 614.

Electric vehicle charging station 610 is a further modified version of electric vehicle charging stations 10, 110, 210, 310 and 410, and is similar in construction thereto, except that it has been modified to eliminate the use of a support arm assembly.

Specifically, electric vehicle charging station 610 is an inexpensive version of the prior embodiments, and includes a hand held conductor 616 which is secured in a cavity 628 of base unit 612. The connector 616 is locked against unauthorized removal by a conventional key locking mechanism 629. Instead of a key operated locking system, an electronic code similar to bank teller machines, i.e., buttons (not shown), could be utilized for locking connector 616 within port 628.

Cable 614 is supported on base unit 612 by a spring mounted pole assembly 615. Pole assembly 615 includes a steel or nonmetallic tube 617, an inverted U-shaped cable guide 619, a coil spring 621 coupled between tube 617 and base unit 612, and a compliant sealing boot 623 surrounding spring 621 for creating a seal between tube 617 and base unit 612. The length of cable 614 and the height of tube 617 are such that if the connector 616 is not restored into its storage cavity 628, then electric connector 616 will hang downwardly but not touch the floor. Thus, spring mounted tube 617 prevents electric connector 616 from getting wet or picking up contaminants from the floor.

Tube 617 is constructed of a rigid, substantially non-bendable material. The inside diameter of tube 617 is slightly larger than the diameter of cable 614 to permit cable 614 to pass therethrough.

Inverted U-shaped cable guide 619 is coupled at one end to the free end of tube 617 for receiving cable 614 therethrough. Preferably, guide 619 is rotatably coupled to tube 617 to allow a limited degree of rotation of guide 619 relative to tube 617. The first half of U-shaped guide 619, which is coupled to tube 617, is a J-shaped tube. The second half of U-shaped guide 619 has an open portion so as to form a channel for receiving cable 614. This allows cable 614 to position itself tangentially relative to the internal radius of guide 619 without strain, when the pole assembly 615 is tilted from the vertical position as seen in FIG. 12.

The bottom portion of pole assembly 615 has a closely wound coil spring 612 coupled thereto. The top end of coil spring 612 has several coils of uniform diameter which frictionally receives the lower end of tube 617. The bottom end of the coil spring 612 has several coils of uniform diameter which fastens onto a collar 625 which is fixedly coupled to base unit 612.

The coil spring 621 is enclosed by compliant sealing boot 623 to prevent moisture and other contaminants from entering base unit 612. Preferably, complaint sealing boot 623 is made of a resilient rubber material.

The spring rate of the coil spring 612 is designed such that tube 617 is normally held in a vertical position, and is capable of being tilted from its vertical position to a substantially horizontal position. When tube 617 is in a substantially horizontal position, spring 612 has a restoring force which somewhat greater than the weight of the cable 614 and connector 616 so that the tube 617 will return to its vertical position when the connector 616 is returned to port 628 of base unit 612.

While several preferred embodiments have been chosen to illustrate the invention, it will be understood by those skilled in the art that various changes and modifications can be made herein without departing from the scope of the invention as defined in the appended claims.

What is claimed is:

1. An electric vehicle charging station for recharging an electric vehicle, comprising:
   a base structure coupled to an electrical power source;
   at least one electrical conductor having a first end and a second end with said first end being electrically coupled to said power source;
   electrical connector means, coupled to said second end of said electrical conductor, for electrically coupling and dispensing electrical energy to the electric vehicle;
   substantially rigid support means, movably coupled to said base structure, for movably supporting said electrical connector means and said electrical conductor between a retracted position and an extended position, said support means including first means for vertically moving said electrical connector means; and
   control means, electrically coupled to said electrical power source, for regulating the flow of said electrical energy from said power source to the electric vehicle.

2. An electric vehicle charging station according to claim 1, wherein
   said support means includes means for horizontally moving said electrical connector means.

3. An electric vehicle charging station according to claim 2, wherein
   said second means is pivotally coupled about a first vertical axis.

4. An electric vehicle charging station according to claim 3, wherein
   said support means includes third means for horizontally moving said electrical connector means about a second vertical axis which is horizontally spaced from said first vertical axis such that said first and second vertical axes are not vertically aligned with each other.

5. An electric vehicle charging station according to claim 1, wherein
   said first means includes a first parallelogram support linkage.

6. An electric vehicle charging station according to claim 5, wherein
   said first means further includes a second parallelogram support linkage movably coupled between said first parallelogram support linkage and said electrical connector means.

7. An electric vehicle charging station according to claim 5, wherein
   said support means includes second means for horizontally moving said electrical connector means.

8. An electric vehicle charging station according to claim 7, wherein
   said second means is pivotally coupled to one end of said first parallelogram support linkage and pivotally coupled to said base structure.

9. An electric vehicle charging station according to claim 7, wherein
   said second means includes a first rigid support arm having a first end pivotally coupled at one end to said first parallelogram support linkage and to a second end pivotally coupled to said base structure.

10. An electric vehicle charging station according to claim 9, wherein
    said second means includes a second rigid support arm for pivotally coupling said second end of said first support arm to said base structure.

11. An electric vehicle charging station according to claim 10, wherein
    said second arm has a first end pivotally coupled to said base structure by a first vertically extending pivot pin and a second end pivotally coupled to said first support arm by a second vertically extending pivot pin.

12. An electric vehicle charging station according to claim 5, wherein
    said first parallelogram support linkage includes at least one hollow tubular member for receiving said electrical conductor therein.

13. An electric vehicle charging station according to claim 12, further comprising
    cooling means coupled to said tubular member, for cooling said electrical conductor by forcing a cooling fluid through said tubular member.

14. An electric vehicle charging station according to claim 12, wherein
    said first parallelogram support linkage is counterbalanced.

15. An electric vehicle charging station according to claim 1, wherein
    said support means includes a rigid tubular member for receiving said electrical conductor therethrough.

16. An electric vehicle charging station according to claim 15, wherein
    said tubular member is movably coupled to said base structure by resilient biasing means for normally biasing said tubular member to said retracted position.

17. An electrical system for transferring electrical energy, comprising:
    a base structure coupled to an electrical power source;

at least one electrical conductor having a first end and a second end with said first end being electrically coupled to said power source;

an electrical connector coupled to said second end of said electrical conductor for electrically coupling and dispensing electrical energy to an electrical device with a complementary electrical connector;

a substantially rigid support member movably coupled to said base structure at one end for moving at least a portion of said electrical conductor between a retracted position and an extended position, said at least a portion of said electrical conductor being coupled to and supported by said support member for movement with said support member in both a horizontal direction and a vertical direction; and a control member electrically coupled to said electrical power source for regulating the flow of said electrical energy from said power source to the electrical device.

18. An electrical system according to claim 17, wherein
   said support member includes a substantially rigid tube with said at least a portion of said electrical conductor extending therethrough, and said support member further includes a spring element coupled between said base structure and said tube.

19. An electrical system according to claim 18, wherein
   said tube extends substantially vertical to said base structure.

20. An electrical system according to claim 17, wherein
   said electrical connector is coupled to said support member for movement in the horizontal and vertical directions.

* * * * *